Dec. 31, 1968 P. J. HOGAN 3,419,057
NUT AND BOLT LOCKING MEANS
Filed June 9, 1967 Sheet 1 of 2

INVENTOR.
PATRICK J. HOGAN
BY
ATTORNEY

Dec. 31, 1968      P. J. HOGAN      3,419,057

NUT AND BOLT LOCKING MEANS

Filed June 9, 1967

INVENTOR.
PATRICK J. HOGAN
BY
ATTORNEY

United States Patent Office 3,419,057
Patented Dec. 31, 1968

3,419,057
NUT AND BOLT LOCKING MEANS
Patrick J. Hogan, Mount Clemens, Mich., assignor to The Budd Company, Philadelphia, Pa., a corporation of Pennsylvania
Filed June 9, 1967, Ser. No. 644,903
3 Claims. (Cl. 151—48)

ABSTRACT OF THE DISCLOSURE

An apparatus for securing a nut and/or a bolt in a desired position and for retaining the nut and/or bolt in that position during extreme vibration and stress cycling. The invention also includes an unlocking spacer cup to be used with the nut/bolt lock for loosening the nut or bolt.

---

This invention relates to nuts and bolts and more particularly to a locking device for securing and releasing a nut and/or a bolt in a desired position.

Various means have been utilized to secure nuts and bolts from loosening under extreme conditions of stress and/or vibration. The previous devices were either destroyed or damaged after one application or did not positively prevent the unscrewing of the secured nut or bolt. This invention provides a spring biased detent anchored to prevent its movement relative to a nut or bolt which it secures in a desired position. The nut or bolt has teeth formed on its outer surface for cooperating with the detent to prevent rotation of the nut or bolt in one direction while permitting the teeth to be ratcheted under the detent when rotated in the opposite direction. A tubular shaped spacer is provided for placement over the nut or bolt to move the detent from engagement with the teeth thereof and permit rotation in either direction of the nut or bolt.

It is an object of the present invention to provide a locking means for a nut and/or bolt that provides a positive locking action to prevent rotation of the nut or bolt in one direction and may be repeatedly used without destruction.

This and other objects of this invention will be readily ascertainable by reference to the accompanying drawings and specification wherein.

Figure 1:
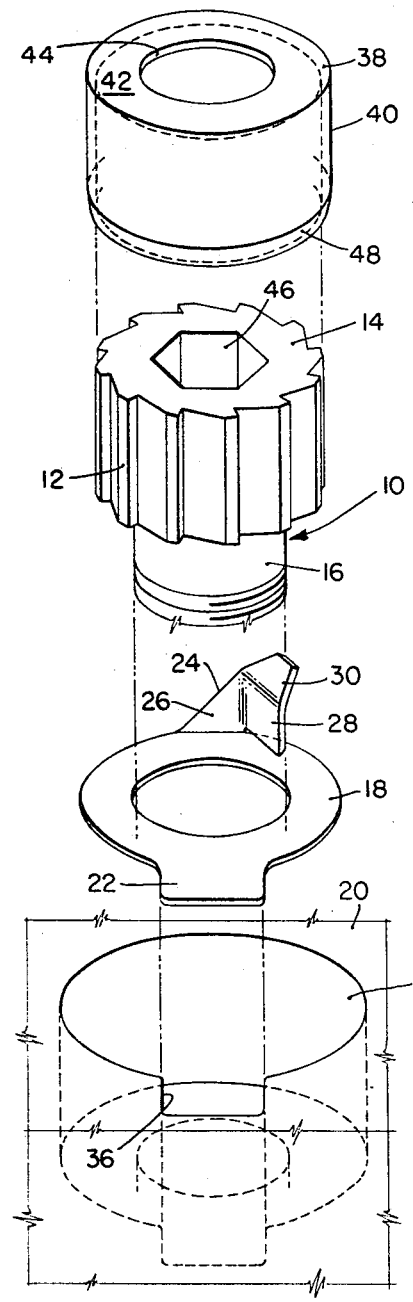
FIG. 1 is an exploded view of the present invention as applied to a socket head bolt.

Referring now to the drawings, as best seen in FIG. 1, a hexagonal socket head cap bolt 10 has a plurality of ratchet teeth 12 formed about the outer periphery of the head 14 and parallel to the longitudinal axis of the bolt. The shaft portion 16 is threaded and positioned for insertion through a spring steel washer 18 and an object to be secured, such as a die 20 for cooperating with a second threaded member for holding the die in place.

The spring steel washer 18 includes a first arm portion 22 substantially in the same plane as the washer and a second arm portion extending substantially at a right angle from the plane of the washer 18.

Figure 2:
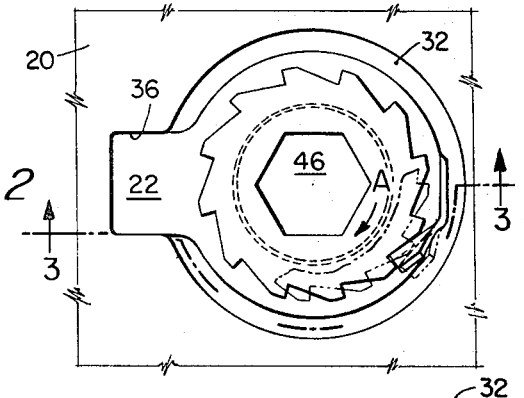
FIG. 2 is a top view of a hexagonal socket head cap bolt positioned in a work piece and secured therein by utilizing the present invention.
Figure 3:
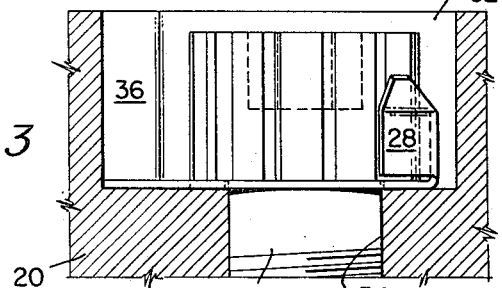
FIG. 3 is a view, in the direction of the arrows, substantially along the line 3—3 of FIG. 2 showing the position of the washer and detent arm thereon engaging the ratchet teeth of the socket head cap bolt.

The second arm 24 has a support section 26 which is connected to the main portion of the washer 18 and extend at a right angle to the plane thereof. A detent section 28 is in a plane at a right angle to the plane of the washer and at a substantially 45° angle to the plane of the support section 26 for engaging the ratchet teeth 12 of the bolt 10 when mounted as seen in FIGS. 2 and 3. An insertion tab 30 extends at an obtuse angle from the plane of the detent section 28 toward the edge of the washer 18 for a purpose to be explained later.

The die 20 has a cylindrical cavity 32 and aperture 34 for receiving the bolt 10 and washer 18 as shown in FIGS. 2–5. The cylindrical cavity 32 has a rectangular portion 36 extending from one side for receiving the first arm 22 of washer 18 and preventing rotative movement of the washer when positioned in the die 20.

Figure 4:
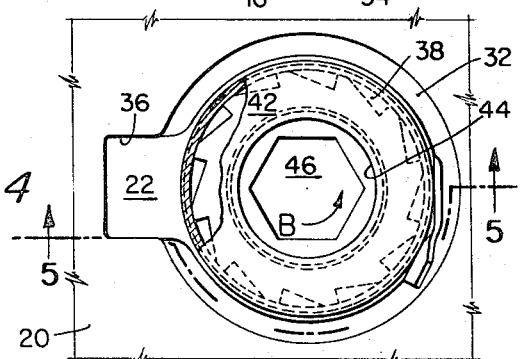
FIG. 4 is a top view, with sections cut away, showing the spacer cup holding the detent from engaging the ratchet teeth of the socket head cap bolt.

A spacer cup 38 has a cylindrical body 40 with an interior diameter slightly greater than the outer diameter of the ratchet teeth 12 and with an end cap 42 on one end. The end cap 42 has an aperture 44 for access to the hexagonal socket 46 formed in the head 14 for receiving an Allen wrench tool (not shown) for screwing the bolt into and out of position for holding the die 20. The open end of the spacer cap 38 has a tapered edge 48 for cooperating with the insertion tab 30 for overcoming the spring biased action of the detent section 28 and removing the detent from engagement with the ratchet teeth 12, as can be seen in FIGS. 4 and 5.

Figure 5:
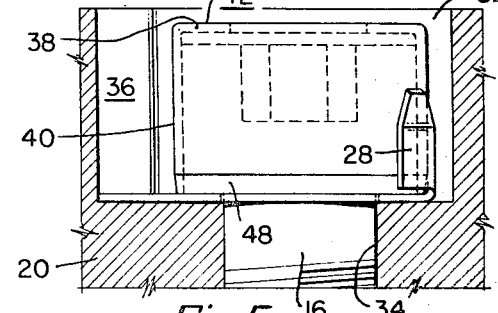
FIG. 5 is a view, in the direction of the arrows, substantially along the line 5—5 of FIG. 4.

In operation, the washer 18 is inserted in the cylindrical cavity 32 of the die 20 with the arm 22 extending into the branch cavity 36 and the second arm 24 extending toward the opening so that the washer rests on the bottom of the cavity 32 as best seen in FIGS. 3 and 5. The shaft 16 of the bolt 10 is then inserted through the washer 18 into the aperture 34 until the threads thereon engage a nut or threaded member (not shown) on the other side of the die 20. An Allen wrench tool (not shown) is then inserted in the hexagonal socket 46 for screwing the bolt 10, in the direction of arrow A of FIG. 2, into the position as seen in FIG. 3, such that pressure is exerted against the washer and die for securing and holding the die in place. As the bolt 10 is screwed into position, the detent 28 is cammed out of the way by the back and top of the ratchet teeth 12, as seen in phantom lines of FIG. 2. Thus it can be seen that the bolt 10 is free to rotate in one direction while contacting the detent 28. When the bolt 10 has secured the die, the detent 28 engages one of the ratchet teeth and prevents rotation of the bolt 10 in the other or reverse direction. Thus, stress and vibration cannot loosen the bolt 10 since the washer 18 is prevented from rotating by the arm 22 being in the branch cavity 36 and the detent 28 thereon is engaging the ratchet teeth 12 of the bolt.

To remove the bolt 10 from the die 20, the open end of spacer cap 38 is placed over the ratchet teeth 12 until the tapered edge 48 contacts the insertion tab 30. The pressure is applied to the spacer cap to force the detent 28 from engagement with the ratchet teeth 12 as best seen in FIGS. 4 and 5. With detent 28 disengaged, an Allen wrench tool is inserted through the aperture 44 into the hexagonal socket 46 and the bolt 10 is rotated in the directed of arrow B, FIG. 4, with the detent 28 sliding along the outer surface of the spaced cap, until the bolt 10, is removed. Thus it can be seen that with the present invention the washer and bolt may be reused again and again since none of the elements are destroyed in the removal.

The devices shown in FIG. 6–10 are other embodiments for using this invention.

Figure 6:
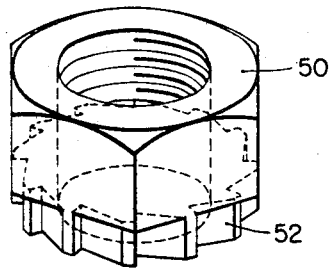
FIG. 6 is a top isometric view of a nut with ratchet teeth formed about the lower periphery.

FIG. 6 shows a hexagonal nut 20 with ratchet teeth 52 formed about the lower periphery for cooperating with a detent of an anchored washer. A simple cylinder or ring could be used for holding the detent from engagement with the ratchet teeth while using an ordinary wrench in the conventional manner to remove the nut from a cooperating threaded stud or bolt.

Figure 7:
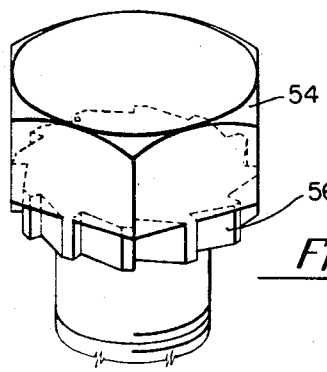
FIG. 7 shows a hexagonal bolt modified for use in the present invention.

FIG. 7 illustrates an alternate construction using a conventional hexagonal head bolt 54 with the ratchet teeth 56 formed about the lower edge adjacent the shaft portion. This embodiment could be used in an application where the exposure of the bolt head is unimportant.

Figure 9:
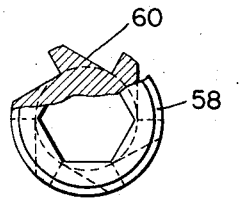
FIG. 9 is a top view, with a section cut away, of the hexagonal socket head cap bolt of FIG. 8.
Figure 8:
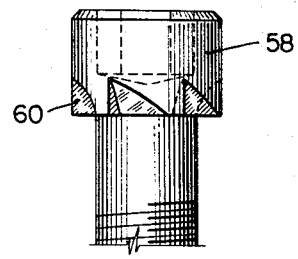
FIG. 8 is a side view of a hexagonal socket head cap bolt with a second embodiment of the ratchet teeth.

FIGS. 8 and 9 illustrate the manner in which the smaller dimensional hexagonal socket head cap bolt 58 may have ratchet teeth 60 cut in their lower periphery and not reduce the strength of the bolt head while providing adequate depth for the ratchet teeth.

Figure 10:
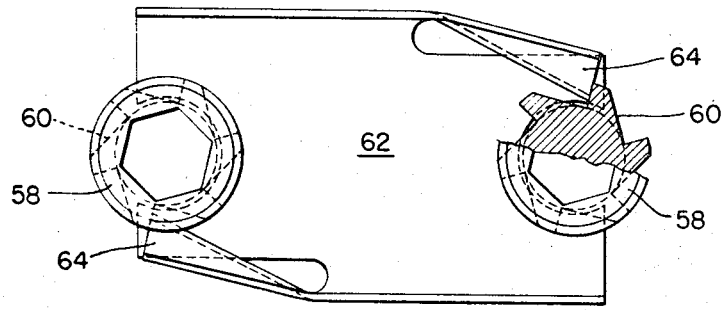
FIG. 10 shows a pair of socket head cap bolts of FIG. 8 acting as anchors for a mutual washer having a pair of detent arms formed thereon for engaging the respective ratchet teeth formed on the cap bolts.

FIG. 10 shows a dual washer 62 of resilient material with a pair of bolts 58 in which the bolts act as mutual anchors for the washer and detents 64 formed thereon.

It is to be understood that the phraseology and terminology employed herein is for the purpose of description and not limitation. Accordingly, the invention is not intended to be limited in its application to the details of construction and arrangement of parts illustrated in the accompanying drawings, except insofar as limited by the prior art and as defined by the following claims.

I claim:

1. A locking means for a threaded member for securing an object in a fixed position, said locking means including a rotatable generally cylindrical threaded member having a threaded shaft portion and a head portion having wrenching means at the upper end thereof including a plurality of longitudinal ratchet teeth formed circumferentially at intervals on the outer surface thereof, a substantially flat washer assembled beneath said head portions; a detent means for cooperating with said teeth for preventing rotation of said threaded member in one direction, said detent means comprising a generally axially extending flexible tab resiliently engaging said ratchet teeth and being integrally carried at one end thereof by said washer, the free end of said tab extending outwardly at an obtuse angle to the remainder of said tab providing a space between said free end and said ratchet teeth; anchor means projecting outwardly from said washer for preventing rotative movement of said detent means; said head portion exerting pressure against said object for securing said object when rotated in the direction opposite said one direction; and spacer means in the form of a cylindrical tubular body being completely open at one end thereof and having a reduced opening at the other end, the inside diameter of said tubular body being greater than the outside diameter of said head portion, and the outside diameter of said tubular body being such as to engage the angularly extending free end of said tab when said tubular body is axially inserted over said head portion, thereby moving and holding said detent means from contact with said teeth when said threaded member is to be rotated in the direction opposite said direction whereby the threaded member may be freely rotated in either direction about its longitudinal axis into and out of engagement with a second cooperating threaded member; said wrenching means being accessible through said reduced opening in said tubular body.

2. A locking means for a pair of cooperating threaded members for securing an object in a fixed position, said locking means including a first rotatable generally cylindrical threaded member having a plurality of longitudinal ratchets on a portion of the outer surface thereof and a second threaded member for cooperating with said first threaded member, each of said members having shoulder portions for securing said object in a fixed position therebetween and wrenching means thereon for connecting and disconnecting said threaded members; a stop on said object; a substantially flat washer positioned between the shoulder of said first threaded member and said object, said washer including a stop arm integrally formed thereon for engaging said stop on said object for preventing rotation of said washer, and a flexible detent arm extending generally axially for resiliently engaging said ratchet teeth of said first threaded member for preventing rotation of said first threaded member in the direction for disconnecting said members, said detent arm having a free end extending outwardly at an obtuse angle from the remainder of said detent providing a space between said free end and said ratchet teeth; and spacer means for initially engaging said free end where spaced from said ratchet teeth and separating said detent from engagement with said ratchet teeth by axial movement toward said object, said spacer means having a cylindrical body and an inside diameter greater than the outside diameter of said ratchet teeth of said first threaded member, said cylindrical body having a sufficient length for moving said detent from engagement with said ratchet teeth by axial movement therealong whereby said spacer means may be positioned about said ratchet teeth for disengaging said detent from said ratchet teeth and making the wrenching means of said first threaded member accessible above said detent for rotating said first threaded member in either direction.

3. A locking means for a pair of threaded units for securing an object in a fixed position, said locking means including a first rotatable generally cylindrical threaded member and a second rotatable generally cylindrical thread member, each of said members having a plurality of ratchet teeth on a portion of the outer surface thereof, each of said members having shoulder portions for securing said object in a fixed position thereagainst and wrenching means thereon for rotating said threaded members; a substantially flat washer positioned between the shoulders of said threaded members and said object, a pair of apertures in said washer for receiving said members and anchoring said washer relative to said members for preventing rotation of said washer, and a pair of flexible detent arms extending above said washer for resiliently engaging said ratchet teeth of said members for preventing rotation of said members in the direction for disconnecting said members, each of said detent arms having a free end for contacting said ratchet teeth of one of said threaded units and an intermediate elbow extending outwardly at an obtuse angle from the contact with the ratchet teeth for providing a space between said elbow and said ratchet teeth; and spacer means for initially engaging said elbow where spaced from said ratchet teeth and separating said detent from engagement with said ratchet teeth by axial movement of the spacer means toward said object, said spacer means having a cylindrical body and an inside diameter greater than the outside diameter of said ratchet teeth of said members, said cylindrical body having a sufficient length for moving said detent from engagement with said ratchet teeth by axial movement thereabout whereby said spacer means may be positioned about said ratchet teeth for disengaging said detent from said ratchet teeth and making the wrenching means of said first threaded member accessible above said detent for rotating said members in either direction so that either or both threaded members may be removed.

References Cited

UNITED STATES PATENTS

| | | | |
|---|---|---|---|
| 793,553 | 6/1905 | Van Thiel | 151—48 |
| 1,051,770 | 1/1913 | Slattery | 151—48 |
| 1,154,813 | 9/1915 | Sellers | 151—48 |
| 1,646,805 | 10/1927 | Bell | 151—39 |
| 2,177,865 | 10/1939 | Collon | 151—48 |

CARL W. TOMLIN, *Primary Examiner.*

BAMON S. BRITTS, *Assistant Examiner.*